United States Patent
Gupta et al.

(10) Patent No.: US 12,333,246 B1
(45) Date of Patent: Jun. 17, 2025

(54) AUTOMATED QUESTION-ANSWER GENERATION SYSTEM FOR DOCUMENTS

(71) Applicant: American Express Travel Related Services Company, Inc., New York, NY (US)

(72) Inventors: Himanshu Gupta, Chhattisgarh (IN); Raaed Ahmed Syed, Telangana (IN); Tarun Kumar, Uttar Pradesh (IN); Tamanna Agrawal, Chhattisgarh (IN); Himanshu Sharad Bhatt, Karnataka (IN)

(73) Assignee: American Express (India) Private Limited, New Delhi (IN)

( * ) Notice: Subject to any disclaimer, the term of this patent is extended or adjusted under 35 U.S.C. 154(b) by 544 days.

(21) Appl. No.: 17/554,761

(22) Filed: Dec. 17, 2021

(51) Int. Cl.
| | |
|---|---|
| *G06F 40/30* | (2020.01) |
| *G06F 40/166* | (2020.01) |
| *G06F 40/211* | (2020.01) |
| *G06F 40/253* | (2020.01) |
| *G06F 40/40* | (2020.01) |
| *G06N 5/01* | (2023.01) |

(52) U.S. Cl.
CPC .......... *G06F 40/211* (2020.01); *G06F 40/166* (2020.01); *G06F 40/253* (2020.01); *G06F 40/30* (2020.01); *G06F 40/40* (2020.01); *G06N 5/01* (2023.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | | |
|---|---|---|---|---|
| 5,870,740 | A * | 2/1999 | Rose | G06F 16/334 |
| | | | | 707/999.005 |
| 6,006,221 | A * | 12/1999 | Liddy | G06F 16/93 |
| | | | | 707/999.005 |
| 9,436,747 | B1 * | 9/2016 | Baker | G06F 40/186 |
| 10,621,390 | B1 * | 4/2020 | Winston | G06F 40/268 |
| 11,100,144 | B2 * | 8/2021 | Galitsky | G06F 21/6218 |
| 2003/0105769 | A1 * | 6/2003 | Harris | G06Q 10/10 |
| | | | | 707/999.102 |

(Continued)

OTHER PUBLICATIONS

Title={Semantic graphs for generating deep questions}, author={Pan, Liangming and Xie, Yuxi and Feng, Yansong and Chua, Tat-Seng and Kan, Min-Yen}, journal={arXiv preprint arXiv:2004.12704}, year={2020} (Year: 2020).*

(Continued)

*Primary Examiner* — Lamont M Spooner
(74) *Attorney, Agent, or Firm* — Sterne, Kessler, Goldstein & Fox P.L.L.C.

(57) ABSTRACT

A system and method for generating question-answer pairs is disclosed. The system and method can receive a document. A sentence and/or a further sentence in the document may be identified. A syntactic map for the sentence and/or the further sentence may be generated. Noun phrases and prepositional phrases may be identified based on the syntactic map. Sentence level questions may be generated based on phrases identified using natural language processing (NLP) techniques. Document level questions can also be generated based on syntactic maps generated and NLP techniques.

12 Claims, 10 Drawing Sheets

(56) References Cited

U.S. PATENT DOCUMENTS

| | | | | |
|---|---|---|---|---|
| 2006/0212288 | A1* | 9/2006 | Sethy | G10L 15/18 704/10 |
| 2009/0030671 | A1* | 1/2009 | Kwon | G06F 40/42 704/2 |
| 2011/0270604 | A1* | 11/2011 | Qi | G06F 40/30 704/9 |
| 2015/0310073 | A1* | 10/2015 | Chakrabarti | G06F 16/2465 707/722 |
| 2015/0356089 | A1* | 12/2015 | Jamrog | G06F 16/24578 707/723 |
| 2016/0275074 | A1* | 9/2016 | Bogdanov | G06F 40/30 |
| 2017/0075877 | A1* | 3/2017 | Lepeltier | G06F 40/117 |
| 2017/0300823 | A1* | 10/2017 | Bostick | H04L 67/306 |
| 2017/0351677 | A1* | 12/2017 | Chaubal | G06F 16/248 |
| 2018/0081934 | A1* | 3/2018 | Byron | H04L 63/10 |
| 2018/0150739 | A1* | 5/2018 | Wu | G06N 20/10 |
| 2018/0260472 | A1* | 9/2018 | Kelsey | G06F 40/56 |
| 2018/0341871 | A1* | 11/2018 | Maitra | G06N 3/042 |
| 2018/0357221 | A1* | 12/2018 | Galitsky | G06F 40/289 |
| 2018/0365228 | A1* | 12/2018 | Galitsky | G06F 40/35 |
| 2019/0102375 | A1* | 4/2019 | Goulikar | G06F 40/186 |
| 2019/0155904 | A1* | 5/2019 | Santos Moraes | G06F 40/279 |
| 2019/0228099 | A1* | 7/2019 | Bajaj | G06N 3/044 |
| 2019/0272323 | A1* | 9/2019 | Galitsky | G06F 40/253 |
| 2020/0125658 | A1* | 4/2020 | Gupta | G06F 16/2365 |
| 2020/0159755 | A1* | 5/2020 | Iida | G06F 40/30 |
| 2020/0183983 | A1* | 6/2020 | Abe | G06F 16/90332 |
| 2021/0012069 | A1* | 1/2021 | Kamigaito | G06F 40/284 |
| 2021/0350079 | A1* | 11/2021 | Singh | G06F 40/30 |
| 2022/0171936 | A1* | 6/2022 | Wang | G06F 40/289 |
| 2022/0284194 | A1* | 9/2022 | Galitsky | G06F 40/35 |

OTHER PUBLICATIONS

Title={Conversational question answering over passages by leveraging word proximity networks}, author={Kaiser et al.}, booktitle={Proceedings of the 43rd International ACM SIGIR Conference on Research and Development in Information Retrieval}, pp. 2129-2132, (Year: 2020).*

* cited by examiner

900

Determine a cosine similarity between: a document level question from the document level questions generated, and one or more paragraphs of the document — 902

For a paragraph from the one or more paragraphs determined to have a highest cosine similarity, transmit the document level question and the paragraph to a Question-Answer Model (QA Model) — 904

Determine, using the QA Model, an answer to the document level question from the paragraph — 906

FIG. 9

AUTOMATED QUESTION-ANSWER GENERATION SYSTEM FOR DOCUMENTS

TECHNICAL FIELD

Aspects relate to systems and methods for performing natural language processing (NLP) of documents.

BACKGROUND

Financial, legal, and corporate policy documents are often lengthy, difficult to read, and filled with terms and numerical data that make them challenging for individuals to understand or get meaningful insights from. Information is also often scattered throughout these documents making it time consuming for individuals to parse through these documents and to comprehend all the meaningful insights that may be obtained.

For example, regulatory financial documents such as Form 10-K or Form 10-Q, which are filed with the United States Securities and Exchange Commission (SEC), may be hundreds of pages long and can contain a large amount of numerical values. These numerical values are typically associated with financial data and may be difficult for lay individuals to understand or parse through due to the length of the documents and the technical nature of the financial data. Similarly, legal contracts and/or corporate policy documents (e.g., internal policies, employment handbooks, etc.) may be lengthy and contain numerous legal terms and/or numerical values that can make these documents difficult and often overwhelming for lay people to read and understand. As a result, most people simply do not read these types of documents in detail. These documents, however, can potentially be a rich source of information that individuals can gain meaningful insights from.

Conventional systems have sought to automate the parsing and summarization of documents using natural language processing (NLP) techniques. However, conventional systems are deficient in many ways when it comes to understanding and giving context to certain types of terminology and/or numerical data within documents. This is because the NLP techniques have not been fine-tuned to understand this type of data in a meaningful way. Often these NLP techniques work using relations (e.g., verbs in sentences) that are not helpful in sentences containing certain terms and/or numerical data because the NLP techniques cannot connect these terms and/or numerical values to proper nouns (e.g., organization names, places, dates, etc.) that they should be associated with to understand the context of those terms and values. This problem is particularly prevalent with financial documents that contain a large number of numerical values and statistics that need to be related to their associated proper nouns. Thus, what is needed is systems and methods to address the aforementioned problem, and to provide improved techniques for processing documents that contain terms and/or numerical values.

SUMMARY

Aspects of this disclosure are directed to a system and methods that employ novel NPL techniques to allow a computer to rapidly parse through, summarize, and obtain meaningful insights of documents that contain terms and/or numerical values. Examples of such documents are financial statements (e.g., financial statements filed with regulatory authorities, corporate financial statements, etc.), legal documents (e.g., contracts, etc.), or company policy documents (e.g., department policies, employee handbooks, corporate rules and regulations, etc.). While the system and methods are described in relation to these types of documents, it should be appreciated that the system and methods disclosed are not limited solely for use with these specific types of documents. The system and methods described may be used with any text-based document.

The system performs its functions by implementing NLP techniques in novel ways to process and recognize the context of certain terms and/or numerical values within a document. The system then generates question-answer pairs around these terms and/or numerical values. These question-answer pairs serve two functions. First, they allow the document to be summarized around certain key concepts extracted from the text of the document. Second, they allow for obtaining meaningful insights about the terms and/or numerical values.

The system leverages two NLP tools to perform its functions. These are: (1) a Question-Answer model (QA model), and (2) a syntactic/syntax map. A syntactic map can break down sentences in a document and can allow the system to understand the grammatical structure of sentences contained in a document. The syntactic map can also give the grammatical relations of words to one another. For example, words may be identified as nouns, adjectives, pronouns, prepositions, etc., and their associations to one another may be indicated by the syntactic map. This grammatical structure is necessary to relate words to one another and to identify key terms in a sentence based on the dependencies between the words.

The QA model allows the system to take in a question regarding a term and/or a numerical value of a sentence and/or paragraph and search for answers to that question within the sentences and/or paragraphs of the document. The QA model allows the system to build questions around terms and/or numerical values, and to answer those questions so that an understanding may be developed about what the sentences and/or paragraphs mean, and what concepts they relate to. To use the QA model, the system also implements a question generation process that can generate and feed questions into the QA model. Thus, the system poses questions and attempts to answer those questions using the text of the document. In this way, it can determine what the document relates to as a result of questions posed about sentences and/or paragraphs of the document.

Using these tools, in addition to other techniques that will be described in this disclosure, the system can frame the problem of how to determine the context and meaning of terms and/or numerical values within a document as a question-answer problem, in which insights are obtained for the terms and/or numerical values by generating questions centered around these terms and numerical values.

The system and methods provide improvements over conventional systems in two primary ways. First, the system works at both a sentence level and at a document level. In other words, the system not only considers terms and/or numerical values for each of the sentences, but also tries to relate these terms and/or numerical values to other sentences of the document. By operating to generate question-answer pairs at both the sentence and document level, the system may better understand the context of the document as a whole. In this way, the system connects terms globally rather than treating each sentence as an isolated unit. Conventional systems typically work only on a sentence level, and therefore can misunderstand the context of certain terms and/or numerical values.

Second, the system employs a novel architecture that allows the system to rapidly retrieve answers to questions it generates. It has been discovered that due to the system's architecture, the time it takes to retrieve answers to questions posed using the QA model is decreased significantly. By way of example, retrieval of answers to questions generated by the system takes approximately one to two seconds. Conventional question-answer systems attempting to perform similar retrieval functions typically retrieve answers to questions in approximately eighty to ninety seconds. Thus, the system improves the overall functioning of computers by significantly improving the time it takes to search for and retrieve data.

In aspects, the system functions by first receiving a document. If operating to generate sentence level questions, the system can identify a sentence in the document. A syntactic map for the sentence may be generated. The syntactic map represents a grammatical structure of the sentence based on dependencies between words in the sentence. The system can then identify noun phrases and prepositional phrases based on the syntactic map. Based on the identified phrases, sentence level questions may be generated.

If operating to generate document level questions, the system can identify multiple sentences in the document. For example, a sentence and a further sentence in the document may be identified. The system can then generate syntactic maps for each of these sentences, and combine the syntactic maps into a larger syntactic map by connecting each of the syntactic maps using common words found in each syntactic map.

Concurrently or sequentially, word vector representations for each word of the sentences may be generated. This may be done by processing each word of the sentence and the further sentence using a Bi-Directional Gated Recurrent Unit (BiGRU). The word vector representations can represent each word in a numerical format. The numerical format allows the system to understand the context and meaning of each of the words in relation to one another. The word vector representations can then be combined into a combined vector representation. The purpose of generating the combined vector representation is to represent the sentences using one vector instead of multiple vectors for each word. The combined vector representation may be generated by computing a weighted average based on each of the word vector representations. Thus, the combined vector representation can represent the entirety of the sentences in one vector.

The system can then generate a structurally aware vector representation of the sentences by processing the combined syntactic map and the combined vector representation. The structurally aware vector representation represents a vector that knows both the syntax of the sentences and the context of the words of the sentences in relation to each other. This is because it can combine the structure derived from the combined syntactic map and the context derived from the combined vector representation. The structurally aware vector representation may be generated by processing the combined syntactic map and the combined vector representation using a Graph Attention Network (GAT).

Using the output of the GAT, the system can further generate a semantic enriched vector representation of the sentences. The semantic enriched vector can indicate the importance of each of each of the words of the sentences to the overall meaning of the sentences. The system can generate the semantic enriched vector by processing the structurally aware vector representation and the word vector representations previously generated using the BiGRU, using a neural network. The semantic enriched vector representation can include numerical values representing the importance of each word in the combined syntactic map. For example, higher numerical values can mean the word has greater significance to understanding a particular sentence. In this way, the system can determine what words are most important and can generate document level questions around those words. Based on the semantic enriched vector representation, the system can generate document level questions.

In aspects, the system can also retrieve answers to the questions it generates. To implement this retrieval functionality, the system can determine a cosine similarity between: a sentence level question or a document level question from the sentence level questions or document level questions generated, and one or more paragraphs of the document. For a paragraph from the one or more paragraphs determined to have a highest cosine similarity, the sentence level question or the document level question and the paragraph may be transmitted to a QA model. The QA model can then determine an answer to the sentence level question or the document level question from the paragraph.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

FIG. 9 is an example method of operating the system to retrieve answers to document level questions generated by the system according to aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
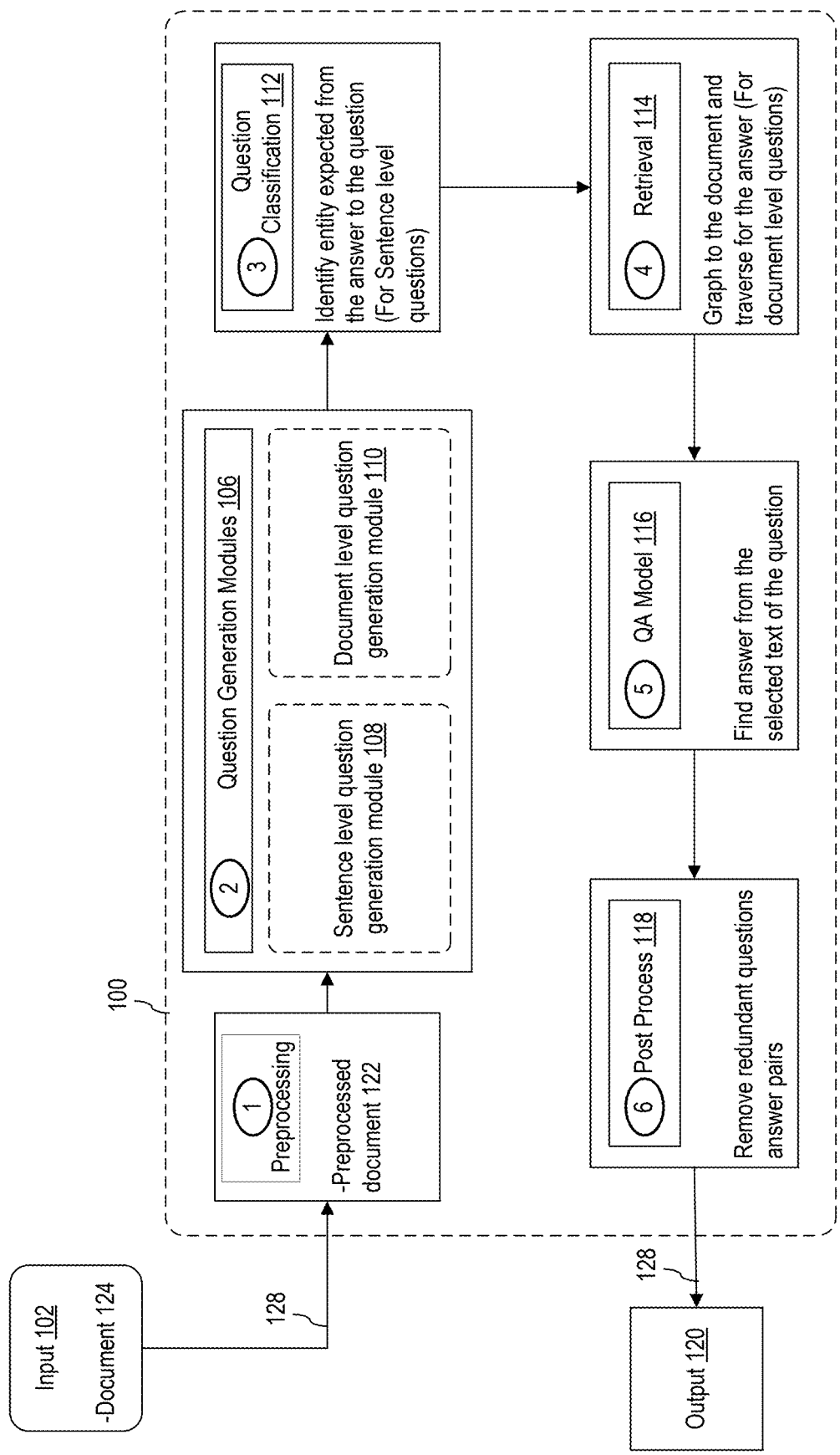
FIG. 1 is an example architecture for a system that processes documents to generate question-answer pairs according to aspects.

The following aspects are described in sufficient detail to enable those skilled in the art to make and use the disclosure.

It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

FIG. 1 is an example architecture for a system 100 that processes documents to generate question-answer pairs according to aspects. The system 100 employs novel NLP techniques and architecture to allow a computer to rapidly parse through, summarize, and obtain meaningful insights of documents that contain terms and/or numerical values. In aspects, the system architecture and the system 100 may be implemented on one or more servers. The servers may be a variety of centralized or decentralized computing devices. For example, a server may be a mobile device, a laptop computer, a desktop computer, grid-computing resources, a virtualized computing resource, cloud computing resources, peer-to-peer distributed computing devices, a server farm, or a combination thereof. The servers may be centralized in a single room, distributed across different rooms, distributed across different geographic locations, or embedded within a network 128. The servers can couple with the network 128 to communicate with other devices, such as a client device. The client device may be any of a variety of devices, such as a smart phone, a cellular phone, a personal digital assistant, a tablet computer, a notebook computer, a laptop computer, a desktop computer, or a combination thereof. The servers and the client device may be stand-alone devices and work independently from one another.

The network 128 refers to a telecommunications network, such as a wired or wireless network. The network 128 can span and represent a variety of networks and network topologies. For example, the network 128 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 128. Cable, Ethernet, digital subscriber line (DSL), fiber optic lines, fiber to the home (FTTH), and plain old telephone service (POTS) are examples of wired communication that may be included in the network 128. Further, the network 128 can traverse a number of topologies and distances. For example, the network 128 can include a direct connection, personal area network (PAN), local area network (LAN), metropolitan area network (MAN), wide area network (WAN), or a combination thereof.

In aspects, system 100 can function by first receiving an input 102. The input 102 can comprise a document 124. The document 124 may be any text-based document such as a text file, a MICROSOFT WORD™ document, a Java Script Object Notation (JSON) formatted text file, etc. In aspects, the transmission of the document 124 to the system 100 may be from a client device to the server(s) via the network 128.

Upon receiving the document 124, in aspects, the system 100 can perform a preprocessing of the document 124. The preprocessing may be performed by modules, which may be programmed to remove any undesirable characters from the document 124. The purpose of removing the undesirable characters is to remove any unnecessary characters that do not add to the understanding of the context of the words of the document 124. The undesirable characters may be, for example, any non-ASCII character contained in document 124, which does not give any context, or meaning to the words. As a result of the removal of undesirable characters, a preprocessed document 122 may be generated that contains all the data of the document 124 except the undesirable characters. In aspects, the preprocessed document 122 may be transmitted to question generation modules 106 so that the system 100 can generate sentence level questions and document level questions based on the preprocessed document 122. A sentence level question is a question for which the answer can be found within a single sentence of a document, whereas a document level question is a question for which the answer is spread out among multiple sentences of a document.

The question generation modules 106 refer to a set of modules and sub-modules that facilitate the generation of sentence level questions and document level questions based on the preprocessed document 122. Sentence level questions refer to questions generated by the system 100 based on individual sentences in the preprocessed document 122. Document level questions refer to questions generated by the system 100 based on multiple sentences and/or paragraphs in the preprocessed document 122. How the questions are generated will be discussed further below.

In aspects, the question generation modules 106 can include a sentence level question generation module 108 and a document level question generation module 110. Each of these modules can have sub-modules. How these modules operate to perform the question generation will be described further below. For the purposes of discussion with respect to FIG. 1, it is assumed that these modules generate sentence level questions and document level questions.

In aspects, once the sentence level questions and document level questions are generated, or as part of the question generation process, the system 100 can perform a question classification 112 on the sentence level questions and a retrieval 114 for the document level questions. The question classification 112 refers to a process by which the system 100 identifies an entity expected from the answer to the sentence level questions. An entity refers to any numerical value or any proper noun. How the identification is performed will be discussed further below. For the purposes of discussion, it is assumed that an identification takes place. The retrieval 114 refers to a process by which the system 100 traverses syntactic maps generated by the system 100, and identifies entities expected from the answers to document level questions. The syntactic maps may be connected to one another based on common words in sentences of the preprocessed document 122 to find and identify an answer to the document level questions. How the traversal and identification is done will be discussed further below. For the purposes of discussion, it is assumed that the traversal and identification takes place.

In aspects, the question classification 112 and the retrieval 114 can utilize a QA model 116 to perform the identification and retrieval of answers. In aspects, the QA model 116 can receive, as inputs, either of the sentence level questions or the document level questions and the text of the preprocessed document 122 and search for the expected answer using both the text of the question and the text of the preprocessed document 122. A person of ordinary skill in the art (POSA) will be familiar with how QA models are implemented and operate. Thus, the details of the QA model 116 will not be described in detail. For the purposes of FIG. 1, it is assumed that a QA model 116 is implemented and retrieves the answer to the questions input into the model based on the text of the preprocessed document 122.

In aspects, the question generation modules 106 and the QA model 116 may at times generate multiple question-answer pairs that are redundant or provide an incorrect answer that does not properly answer the question. As a result, and in aspects, the system 100 can also implement a post processing 118 that removes redundant, incorrect, or irrelevant question-answer pairs generated by the system 100. This post processing 118 may be implemented as an automated process and/or manual process in which redundant, incorrect, or irrelevant question-answer pairs are identified and removed prior to the question-answer pairs being output by the system 100. For example, the post processing 118 can determine whether there are two question-answer pairs generated to the same question and determine which of the answers is most relevant or has a higher probability to be correct. This may be done by training the system 100 to recognize correct answers based on patterns of previous answers to similarly posed questions. In this way, the system 100 can recognize what types of terms and/or values to expect for a question and discard any nonsensical answer generated by the system 100. In aspects, this can also be done by having an administrator or users of the system manually review answers provided by the system 100 and tag any irrelevant or nonsensical answers generated as a part of the training process. In this way, over time, the system 100 can learn patterns and answers it can expect for certain question types and provide answers as an output 120 of the system 100 that have a higher probability of being correct.

In aspects, the architecture of FIG. 1 may be implemented by dividing the functions described across various processing units of the server or on multiple servers. For example, in aspects, the question generation modules 106 may be deployed on one server, or the question generation process may be handled by one processing unit of the server, while the QA model 116 may be deployed on a separate server, or handled by a separate processing unit of the server. In aspects, the QA model 116 may be deployed on a dedicated server as a Flask application. Flask refers to a web framework on which applications may be deployed. A POSA will be familiar with Flask and how to implement an application using a Flask framework. Thus, the details of how the QA model 116 is deployed as a Flask application will not be discussed in detail.

It has been discovered that dividing the question generation and the answer retrieval functions in this manner greatly increases the performance of the system 100, because by splitting the functions, each server or processing unit of the server can perform each of the question generation and answer retrieval functions much faster. By way of example, retrieval of answers to questions generated by the system 100 that is partitioned in this manner takes approximately one to two seconds. Conventional question-answer systems attempting to perform similar retrieval functions typically retrieve answers to questions in approximately eighty to ninety seconds. Thus, the partition of the system 100 improves the overall functioning and information retrieval capabilities of the system 100 over conventional systems.

Figure 2:
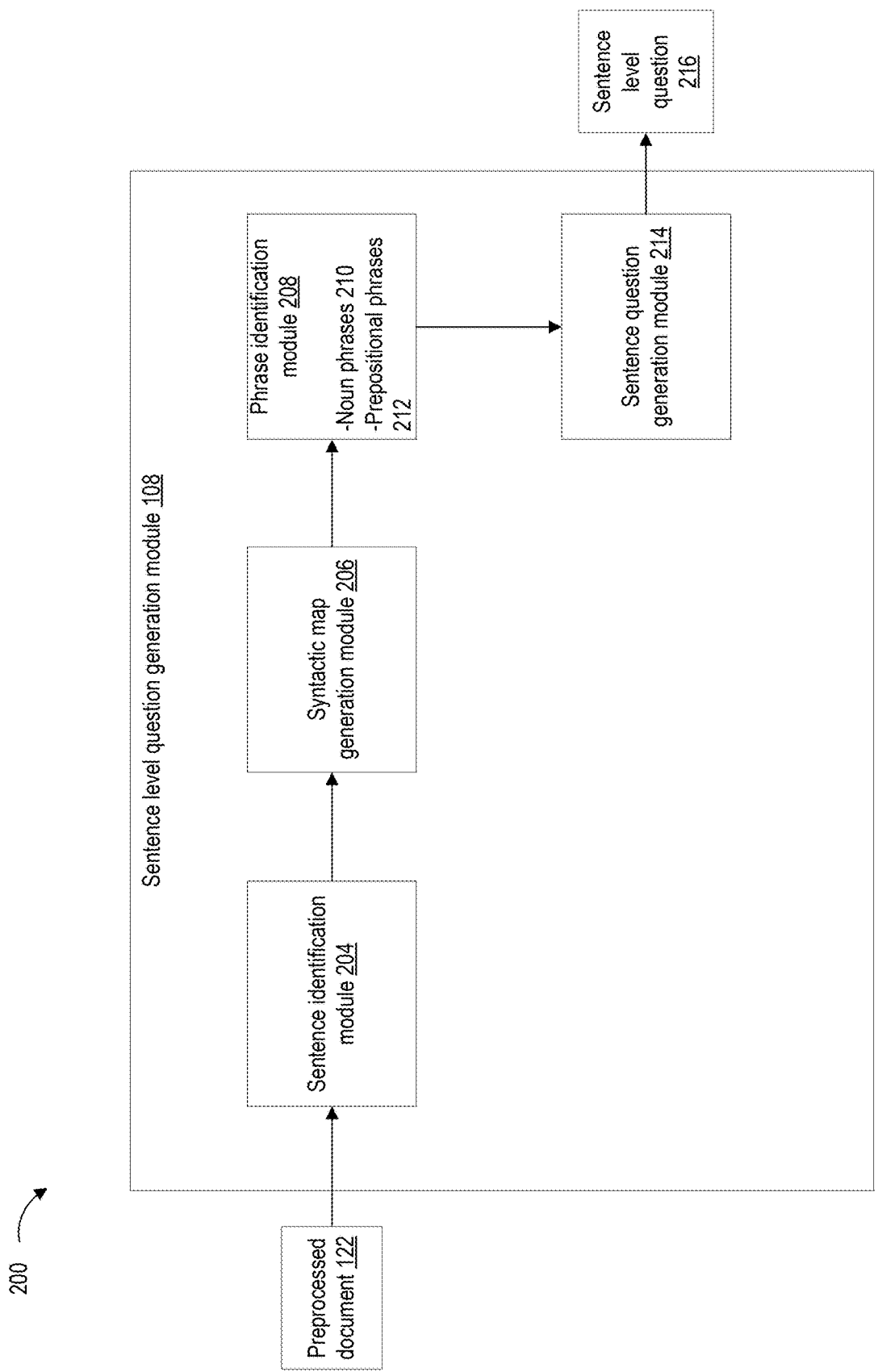
FIG. 2 is an example control flow for how sentence level questions are generated by the system according to aspects.

FIG. 2 is an example control flow 200 for how sentence level questions are generated by the system 100 according to aspects. Control flow 200 may be implemented using the sentence level question generation module 108 of FIG. 1. The sentence level question generation module 108 can utilize several sub-modules to implement control flow 200. These can include a sentence identification module 204, a syntactic map generation module 206, a phrase identification module 208, and a sentence question generation module 214.

In aspects, control flow 200 may begin by having the sentence identification module 204 receive the preprocessed document 122. The sentence identification module 204 can enable the identification of sentences of the preprocessed document 122. In aspects, the identification may be done based on the sentence identification module 204 parsing the preprocessed document 122 to identify delimiters such as periods indicating the beginning and ending of sentences in the preprocessed document 122. In aspects, once the sentence identification module 204 identifies all the sentences of the preprocessed document 122, control and the identified sentences may be passed to the syntactic map generation module 206.

Figure 3:
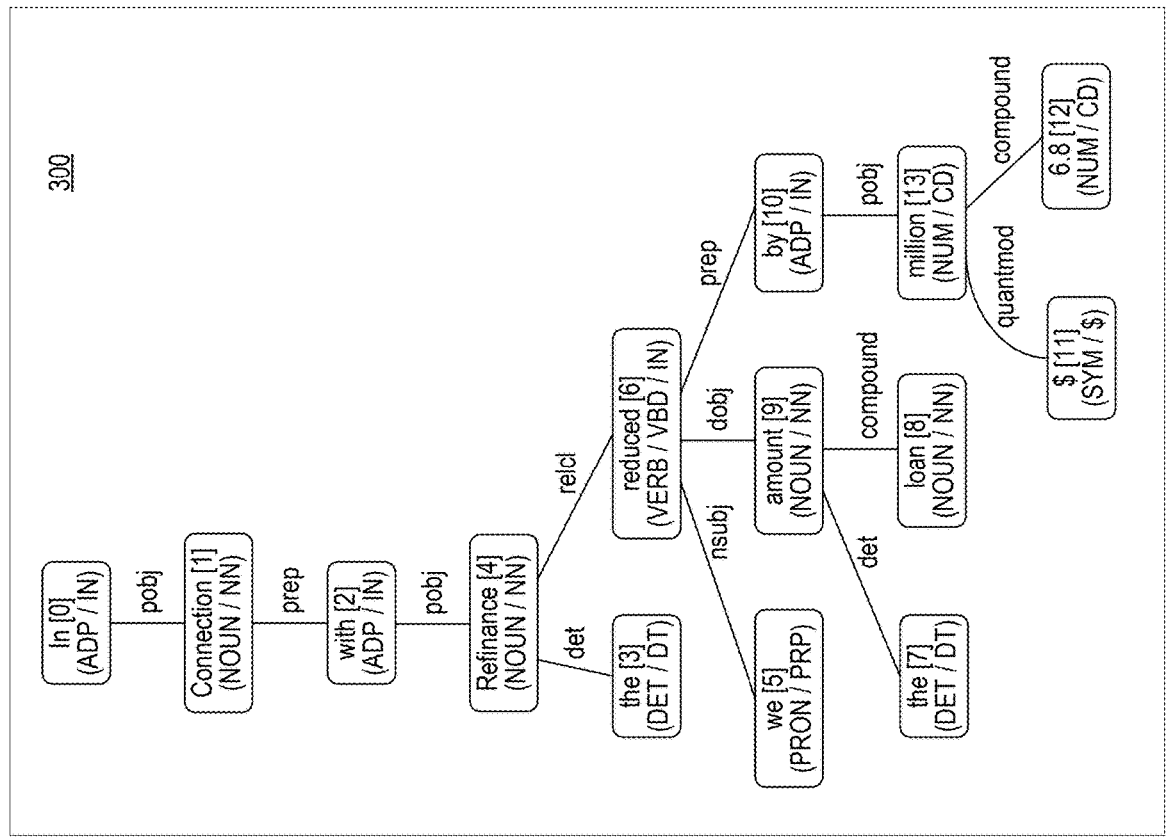
FIG. 3 is an example syntactic map for a sentence according to aspects.

The syntactic map generation module 206 can enable the generation of a syntactic map for each of the sentences identified. The syntactic map can represent a grammatical structure of a sentence based on dependencies between words of the sentence. This grammatical structure may be represented as a tree data structure, which itself comprises the syntactic map. Such tree data structure representing the syntactic map of a sentence is shown in FIG. 3 as the syntactic tree labeled 300. Generation of syntactic maps will be familiar to a POSA. Therefore, the details of how the syntactic map for each of the sentences is generated will not be described in detail. For the purposes of FIG. 2, it is assumed that the syntactic map generation module 206 implements computer code and/or a process to allow for generation of a syntactic map of each of the sentences identified. In aspects, once a syntactic map is generated for a sentence, control and the syntactic map may be passed to the phrase identification module 208.

The phrase identification module 208 can enable the identification of words in a sentence that questions may be built around. In aspects, the phrase identification module 208 can implement two techniques to identify the words. These include techniques to identify noun phrases 210 and to identify prepositional phrases 212 in a sentence. The identification may be done based on traversing the syntactic map and identifying relations between the different words of the sentence. Based on the identification of the noun phrases 210 and the prepositional phrases 212, sentence level questions may be generated around keywords of those phrases.

With respect to identification of noun phrases 210, in aspects, the noun phrases 210 may be identified in the following manner. First, a search for a noun and pronoun may be performed for a sentence. Second, once a noun or pronoun is identified in a sentence, a search for any compound noun or adjective related to the noun or pronoun is performed. Based on identifying the noun, pronouns, compound noun, and adjective, the phrase identification module 208 can determine which words of the sentence are the subjects or objects of the sentence for which to build a question around. By way of example, and taking the sentence "In connection with the refinance we reduced the loan amount by $6.8 million," a search for a noun or pronoun may be performed. In the example sentence, the noun "loan" is a noun and may be identified. Once identified, a search for a compound noun or adjective for that noun may be performed. In the example sentence, the compound "amount" can also be identified in relation to "loan." Thus, the words "loan amount" may be identified as a compound noun. In aspects, once identified the compound noun may be transmitted to a sentence question generation module 214, which can generate a sentence level question based on the compound noun. How the sentence question generation module 214 generates the sentence level question will be discussed further below.

With respect to identification of prepositional phrases 212, in aspects, the prepositional phrases 212 may be identified in the following manner. First, a search for a preposition is performed for a sentence. Second, once a preposition is identified in a sentence, a search is performed for the words to the right and left of the preposition. Third, once the words to the right and left of the preposition are identified all the words may be connected to form the prepositional phrase. In this manner prepositional phrases 212 may be identified. By way of example, and once again taking the sentence "In connection with the refinance we reduced the loan amount by $6.8 million," a search for a preposition may be performed. In the example sentence, the preposition "with" may be identified. Once identified, a search for the words to the right and left of "with" may be performed to identify the nouns and pronouns that the preposition is connecting. In the example sentence, these words are "connection" and "the refinance." Thus, the phrase "connection with the refinance" may be identified as the prepositional phrase. In aspects, once identified, the prepositional phrase may be transmitted to the sentence question generation module 214, which can generate a sentence level question based on the prepositional phrase.

In aspects, once the noun phrases 210 and the prepositional phrases 212 are identified, the noun phrases 210 and the prepositional phrases 212 and control may be passed to the sentence question generation module 214. The sentence question generation module 214 can enable generating a sentence level question 216 based on the noun phrases 210 and the prepositional phrases 212. In aspects, this may be done by having the sentence question generation module 214 build sentences based on the words of the noun phrases 210 and the prepositional phrases 212. For example, by looking at the words in the noun phrases 210 and the prepositional phrases 212 the sentence question generation module 214 can determine what types of interrogative word should be chosen to append to the beginning of the noun phrases 210 or the prepositional phrases 212. In aspects, the interrogative words may be "which," "what," "whose," "who," "whom," "where," "when," "how much," etc. Based on what words are in the noun phrases 210 or prepositional phrases 212, different interrogative words may be chosen to append to the beginning of each phrase. By way of example, and once again taking the sentence "In connection with the refinance we reduced the loan amount by $6.8 million," based on identifying the compound noun "loan amount," the sentence question generation module 214 can determine that what the words are non-numerical words, and the appropriate interrogative words that may be appended to the compound noun are, for example, "what," or "whose." In aspects, what appropriate interrogative words to be chosen may be based on training the sentence question generation module 214, using a machine learning process, to identify which of the interrogative words is used more commonly with a term like "loan amount." Thus, the sentence question generation module 214 can generate a sentence level question 216 by appending "what" or "whose" in front of the compound noun to obtain the question "what loan amount?" or "whose loan amount?" In aspects, a sentence level question 316 may be generated using both or one of the interrogative words.

Similarly, for the prepositional phrase "connection with refinance" the sentence question generation module 214 can determine that what is being discussed are similarly non-numerical words and that the appropriate interrogative words are, for example, "what" or "whose." Thus, the sentence question generation module 214 can generate a sentence level question 216 by appending "what" or "whose" in front of the prepositional phrase to obtain the question "what in connection with refinance?" or "whose in connection with refinance?"

In aspects, if a numerical value is identified in the noun phrases 210 or prepositional phrases 212 interrogative words such as "when," "how much," etc. may be used depending on the type of numerical value identified. For example, if a date is identified the interrogative word "when" may be used to generate the sentence level question 216, whereas if a dollar amount is identified the interrogative word "how much" may be used to generate the sentence level question 216.

FIG. 3 is an example syntactic map 300 for a sentence according to aspects. FIG. 3 graphically shows the syntactic map 300 for the example sentence of FIG. 2 "In connection with the refinance we reduced the loan amount by $6.8 million." As shown in FIG. 3, the syntactic map 300 breaks the words of the sentence down into a tree data structure. The tree data structure can indicate what part of speech each word represents and how each of these words relates to one another. For example, the word "connection" is identified as a noun. The words "in" and "with" are identified as prepositions. Syntactic map 300 also indicates that relation of the word "in" to "connection" is that "connection" is the object of the preposition, as shown by the line connecting in to connection labeled "pobj." Similar types of identifications and connections of words are shown. Various open source tools may be used to generate the syntactic map 300 as will be recognized by a POSA. These tools can include Stanford's Core NLP Suite, Natural Language Toolkit, Apache OpenNLP, or similar open source tools. Such open source tools may be integrated into the system 100, and particularly with the syntactic map generation module 206, to implement the programming code to generate the syntactic map 300.

Figure 4:
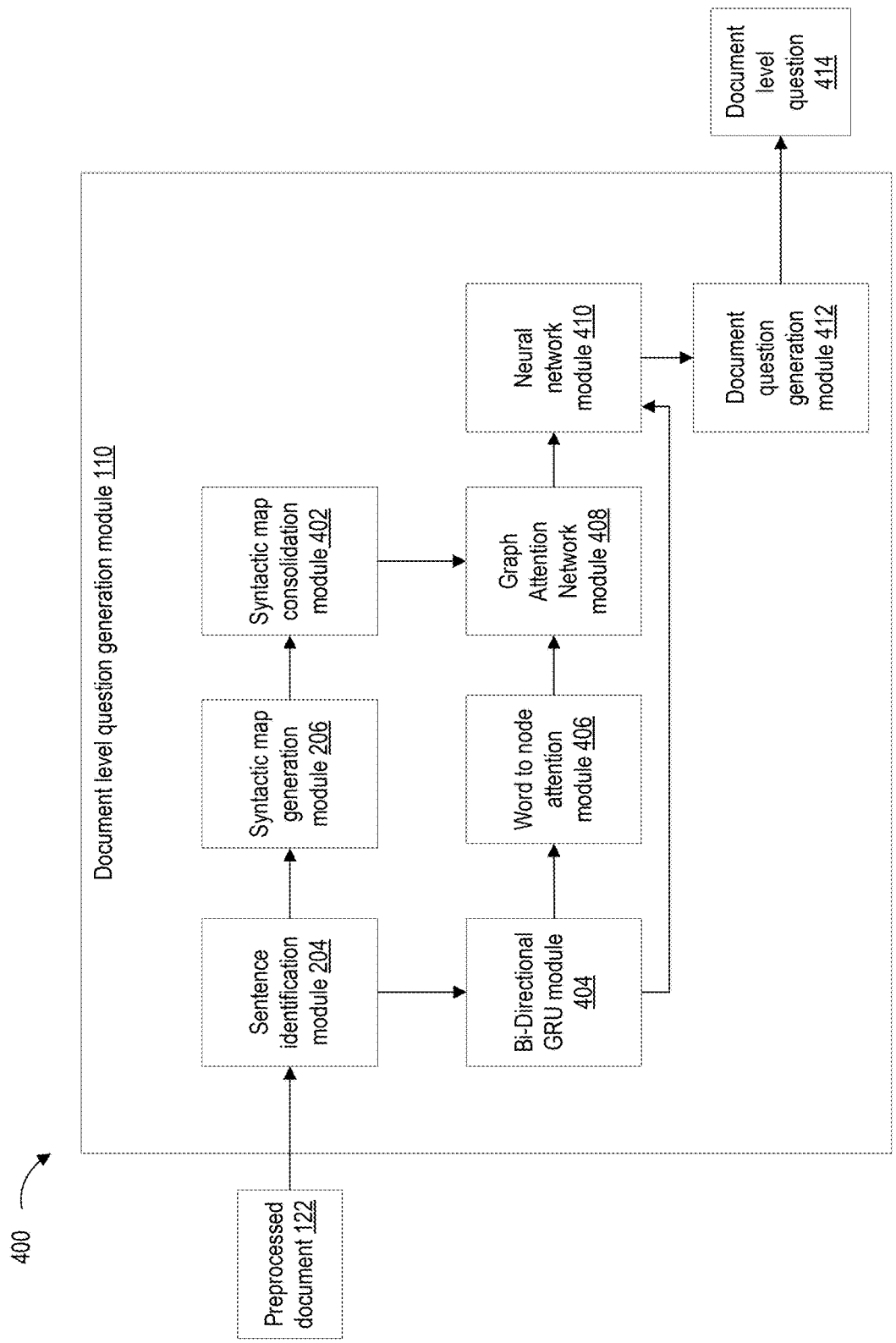
FIG. 4 is an example control flow for how document level questions are generated by the system according to aspects.

FIG. 4 is an example control flow 400 for how document level questions are generated by the system 100 according to aspects. Control flow 400 may be implemented using the document level question generation module 110 of FIG. 1. The document level question generation module 108 can utilize several sub-modules to implement control flow 400. These can include the sentence identification module 204, the syntactic map generation module 206, a syntactic map consolidation module 402, a BiGRU module 404, a word to node attention module 406, a graph attention network module 408, a neural network module 410, and a document question generation module 412.

In aspects, control flow 400 may begin by having the sentence identification module 204 receive the preprocessed document 122. The sentence identification module 204 may be the same sentence identification module 204 as describe with respect to FIG. 2, and function in the same manner to identify sentences in the preprocessed document 122. However, it should be appreciated that because the document level questions are based on multiple sentences in the document, the sentence identification module 204 should identify at least two sentences in the preprocessed document 122. For example, this may be a sentence and a further sentence in the preprocessed document 122.

In aspects, once the sentence identification module 204 identifies all the sentences of the preprocessed document 122, control and the identified sentences may be passed to the syntactic map generation module 206. The syntactic map generation module 206 may be the same syntactic map generation module 206 as described with respect to FIG. 2, and can function in the same manner to generate a syntactic map for each of the sentences identified. Thus, in the case of two sentences it may be a syntactic map and a further syntactic map. In aspects, once a syntactic maps are generated, control and the syntactic maps may be passed to the syntactic map consolidation module 402.

The syntactic map consolidation module 402 can enable the consolidation of the syntactic maps into a combined syntactic map. In aspects, this is done by connecting each syntactic map generated using common words found in each of the syntactic maps. Thus, if the word "loan" appears in each of the syntactic maps, tree data structures representing each syntactic map may be connected to one another through pointers or similar connectors, connecting the branch or leaf representing the word "loan" in each of the syntactic maps. In this way, a combined syntactic map representing the entirety of the sentences in the preprocessed document and their relation to one another may be generated. In aspects, once the combined syntactic map is generated, control and the combined syntactic map may be passed to a Graph Attention Network (GAT) module 408 to be processed. How the GAT module 408 processes the combined syntactic map will be discussed further below.

In aspects, and concurrently or sequentially while the combined syntactic map is being generated, a copy of the preprocessed document 122 may be transmitted to a BiGRU module 404 to generate word vector representations for each word of the sentences identified. The word vector representations can represent each word in a numerical format. Thus, each word can have a vector associated with it with real-numbers representing that word. The numerical format allows the system to understand the context and meaning of each of the words in relation to one another and allows that word to be processed and manipulated by computers. The BiGRU module 404 can implement a BiGRU to generate each of the word vector representations. A BiGRU refers to a sequence processing model that consists of two gated recurrent units. A first one taking the input in a forward direction, and the other in a backwards direction. It is a bidirectional recurrent neural network with only the input and forget gates. A POSA will be a familiar with a BiGRU and how it functions. In aspects, the input to the BiGRU are each of the words of the sentences and the output is the word vector representations. In aspects, once the word vector representations are generated for each word in the sentences, control and the word vector representations may be passed to the word to node attention module 406.

In aspects, the word to node attention module 406 can enable the generation of a combined vector representation of each word of the sentences by computing a weighted average based on each of the word vector representations. Thus, the word to node attention module 406 combines the word vector representations into one combined vector, which is the combined vector representation, representing the entirety of the sentences. What weightings are determined for each word may be based on training the word to node attention module 406 to assign weights to particular words based on a corpus of data to indicating the relative importance of these words to sentences. In aspects, once the combined vector representation is generated, the combined vector representation and control may be passed to the GAT module 408 to process the combined vector representation in conjunction with the combined syntactic map generated by the syntactic map consolidation module 402.

In aspects, the GAT module 408 can enable the generation of a structurally aware vector representation of the sentences by processing the combined syntactic map and the combined vector representation by implementing a GAT. Thus, the inputs to the GAT are the combined syntactic map and the combined vector representation. A GAT is a particular class of neural networks used for processing data represented by graph data structures. A POSA will be familiar with how GATs operate and the details of which will not be discussed in detail. For the purposes of discussion with respect to FIG. 4 it is sufficient to understand that the inputs into the GAT is the combined syntactic map and the combined vector representation. Based on processing the inputs, the GAT module 408 can output the structurally aware vector representation of the sentences. The structurally aware vector representation represents a vector that indicates both the syntax of the sentences and the context of the words of the sentences in relation to each other. This is because it can generate a vector that combines the structure derived from the combined syntactic map for each word, and the context derived from the combined vector representation for each word. In aspects, once the structurally aware vector representation is generated, control and the structurally aware vector representation may be passed to a neural network module 410 to generate a semantic enriched vector representation of the sentences.

In aspects, the neural network module 410 can enable generating the semantic enriched vector. The semantic enriched vector can indicate the importance of each of the words of the sentences to the overall context and meaning of the sentences. Neural network module 410 can generate the semantic enriched vector by processing the structurally aware vector representation and the word vector representations previously generated using the BiGRU, using a neural network trained to classify the importance of each word to a sentence. Thus, the neural network is trained to detect patterns of words in sentences and determine the importance of each of the words to the sentence. This, however, is done with the knowledge of the syntax of the words, thus, allowing the neural network to give weights to the words based on what parts of speech they represent. The semantic enriched vector representation can include numerical values representing the importance of each word in the combined syntactic map. For example, higher numerical values can mean the word has greater significance to understanding a particular sentence. In this way, the system can determine what words are most important and can generate document level questions around those words in a process similar to how sentence level questions are generated. Thus, based on the semantic enriched vector representation, the system can generate document level question by focusing on the most important words identified. By way of example, in the sentence "Eastern Market is a historic commercial district in Detroit, Michigan. Michigan is a state in the Great Lakes and Midwestern region of the United States," the very important words may be identified as "Eastern Market" and "United States," because they signify the specific location being discussed, important words may be identified as "Michigan" and "Detroit" because they are implicit from the identification of the very important words, and less important words may be identified as "historic," "commercial," "district," and "state," because they are descriptive of the very important words.

In aspects, once the semantic enriched vector representation is generated by the neural network module 410, the semantic enriched vector representation and control may be passed to the document question generation module 412. The document question generation module 412 can enable the generation of a document level question 414. In aspects, in order to generate the document level question 414, the document question generation module 412 can implement an long-short term memory (LSTM) decoder that generates the words of the target question step-by-step by focusing on the very important or important words identified by the semantic enriched vector representation, and building questions around these words. For example, for the example sentences "Eastern Market is a historic commercial district in Detroit, Michigan. Michigan is a state in the Great Lakes and Midwestern region of the United States," the very important words identified may be "Eastern Market," and "United States," and important words identified may be "Michigan," and "Detroit."

In aspects, the document level question 414 may be constructed by first looking at the very important words and determining what that word is. In the case of the example sentence, the very important words are "Eastern Market" and "United States" which are geographic locations. Thus, interrogative words such as "what," "where," etc. may be determined to be appropriate to begin with when generating the document level question 414, as opposed to "how much," "when," etc. that might be more appropriate if the very important or important words were numerical values or dates. Thus, first an interrogative words, for example, "In what" may be used to start the document level question 414. The decoder then determines what word to append next by making a determination whether to generate a word based on a probability of what it believes should come next, or whether to copy the very important or important word directly into the question. Thus, at every step, the decoder computes the probability of every word that it may generate and chooses the word with maximum probability that it believes should come next. This probability may be determined based on training the decoder on a corpus of data that contains a variety of sentences and phrases so that it can learn what words typically come after each other. Thus, in this way, the decoder can generate words to append to the sentence until a maximum sequence length is reached or the end of a sequence token is generated, whichever is earlier. In aspects, if the highest probability word still has a low probability or confidence score that it should come next based on being below a predetermined threshold probability value, the decoder can copy the very important or important word directly into the document level question 414. This might be the case when a rare word is used in a sentence or the decoder has not been trained to recognize a particular word sequence. Based on the aforementioned process, output of the document question generation module 412 may be the document level question 414.

Figure 5:
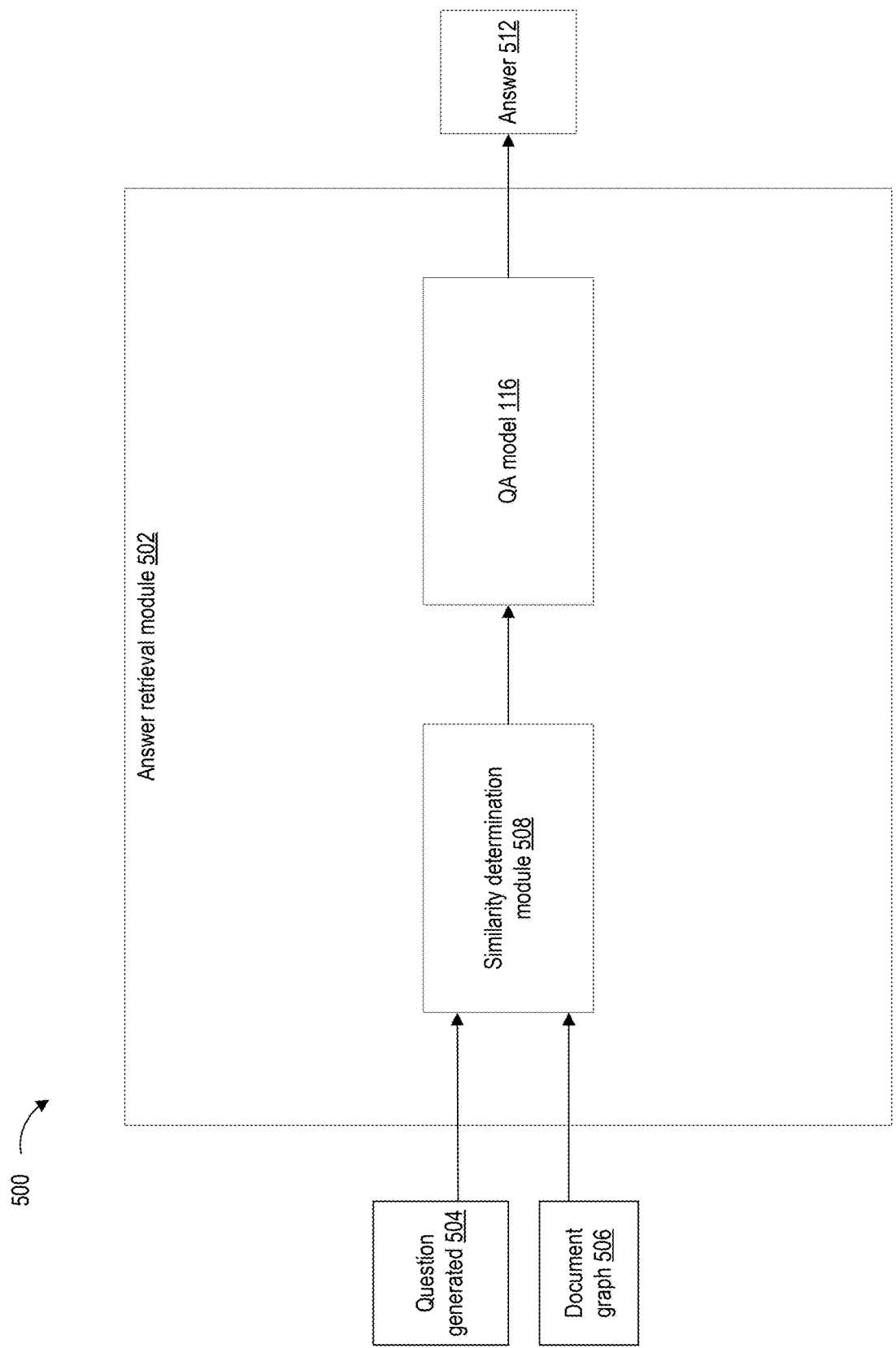
FIG. 5 is an example control flow for how answers to questions generated by the system are retrieved according to aspects.

FIG. 5 is an example control flow 500 for how answers to questions generated by the system 100 are retrieved according to aspects. Control flow 500 may be implemented using an answer retrieval module 502, which can implement the QA model 116 of FIG. 1 in addition to other modules, to retrieve an answer 512 based on the questions generated by the system 100. These other modules can include a similarity determination module 508 and any associated sub-modules.

In aspects, control flow 500 may begin by having a question generated 504 and a document graph 506 input into the similarity determination module 508. The question generated 504 may be any of the sentence level questions or document level questions generated by the system 100. The document graph 506 can the combined syntactic map described with respect to FIG. 2. In aspects, the similarity determination module 508 can enable the determination of a cosine similarity between the question generated 504 and one or more sentences and/or, in the case that the preprocessed document 122 comprises sentences making up paragraphs, one or more paragraphs of the preprocessed document 122 of FIG. 1. A cosine similarity is a measure of similarity between two non-zero vectors of an inner product space. Because the question generated 504 and the document graph 506 are represented as vectors to the system 100, such a cosine similarity may be determined. The cosine similarity will indicate a value indicating how similar the terms of the question are to any particular sentence or paragraph of the preprocessed document 122. In this way, the cosine similarity can indicate what sentences or paragraphs are likely to have the answers to the question asked. Thus, if the same terms or numerical values are posed in a question and found in a particular sentence or paragraph of the preprocessed document 122, a higher cosine similarity value will be generated for that particular sentence or paragraph. A POSA will recognize how a cosine similarity is determined and the details of the computations involved will not be discussed in detail. For the purpose of FIG. 5, it is assumed that a cosine similarity is determined.

In aspects, for a sentence or a paragraph determined to have a highest cosine similarity to the question generated 504, the question generated 504 and the particular sentence or paragraph may be transmitted to the QA model 116. The QA model 116 can then search the paragraph for an answer 512 to the question generated 504. In aspects, the QA model 116 may be implemented with open source models. These open source models may be, for example, Neo4j and Apache Lucene, or HuggingFace Distil Bert that may be used to implement the QA model 116 and provide the search and answer retrieval functions. In this way, an answer 512 to the sentence level questions or document level questions may be determined.

The modules described in FIGS. 1-5 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the system 100 described above improves the state of the art from conventional systems in two primary ways. First, the system 100 works at both a sentence level and at a document level. In other words, the system not only considers terms and/or numerical values for each of the sentences, but also tries to relate these terms and/or numerical values to other sentences of the preprocessed document 122. By operating to generate question-answer pairs at both the sentence and document level, the system 100 may better understand the context of the preprocessed document 122 as a whole. In this way, the system 100 connects terms globally rather than treating each sentence as an isolated unit. Conventional systems typically work only on a sentence level, and therefore can misunderstand the context of certain terms and/or numerical values.

Second, the system 100 employs a novel architecture that allows the system 100 to rapidly retrieve answers to questions it generates. It has been discovered that due to the system's 100 architecture, the time it takes to retrieve answers to questions posed using the QA model 116 is decreased significantly. By way of example, retrieval of answers to questions generated by the system 100 takes approximately one to two seconds. Conventional question-answer systems attempting to perform similar retrieval functions typically retrieve answers to questions in approximately eighty to ninety seconds. Thus, the system 100 improves the overall functioning of computers by significantly improving the time it takes to search for and retrieve data.

Methods of Operation

Figure 6:
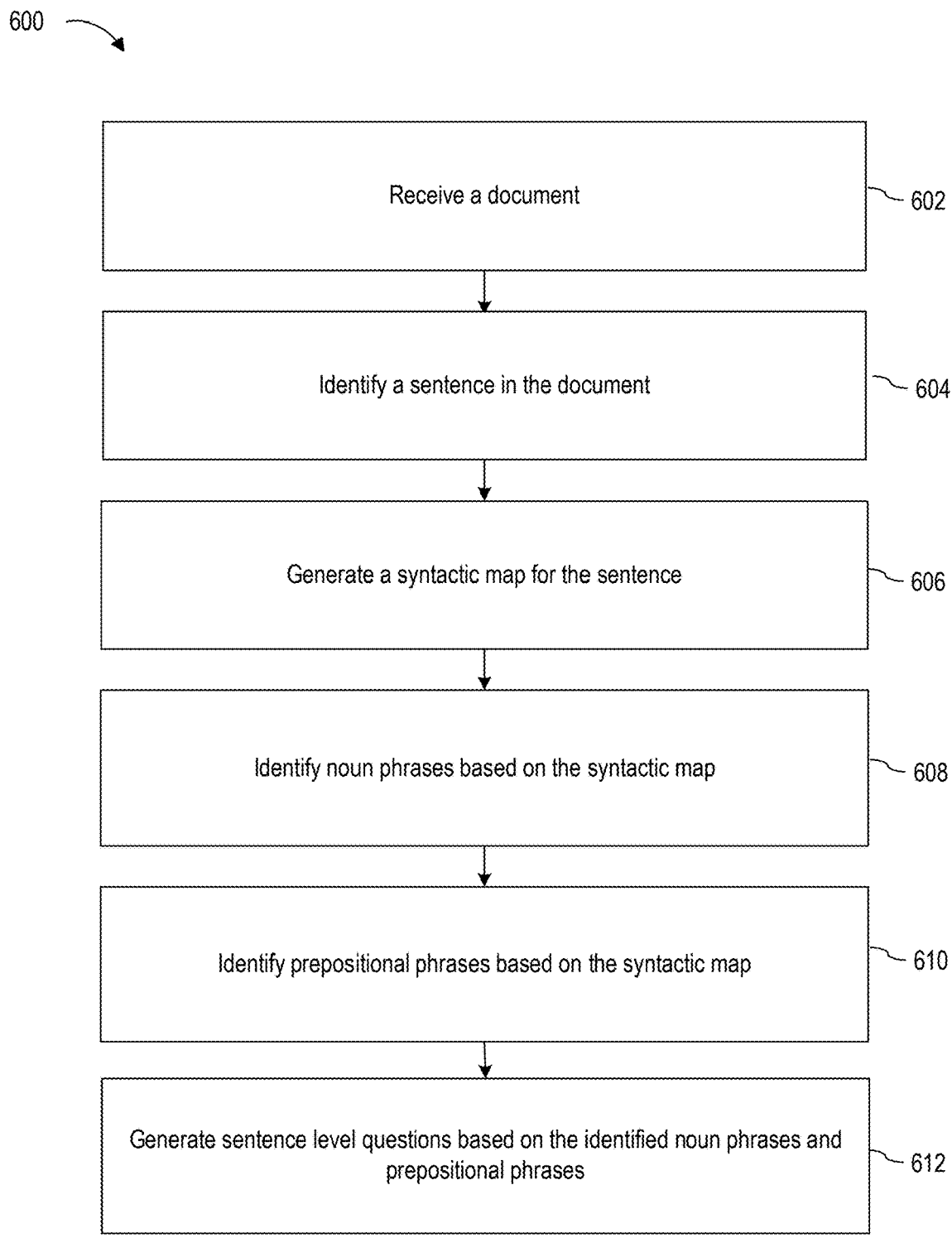
FIG. 6 is an example method of operating the system to generate sentence level questions according to aspects.

FIG. 6 is an example method 600 of operating the system 100 to generate sentence level questions according to aspects. Method 600 may be performed as a series of steps by a computing unit such as a processor. At step 602, method 600 can include receiving a document. The document may be the preprocessed document 122. At step 604, a sentence in the document is identified. At step 606, a syntactic map for the sentence may be generated. At step 608, noun phrases may be identified based on the syntactic map. At step 610, prepositional phrases may be identified based on the syntactic map. At step 612, based on the identified noun phrases and prepositional phrases a sentence level question may be generated.

Figure 7:
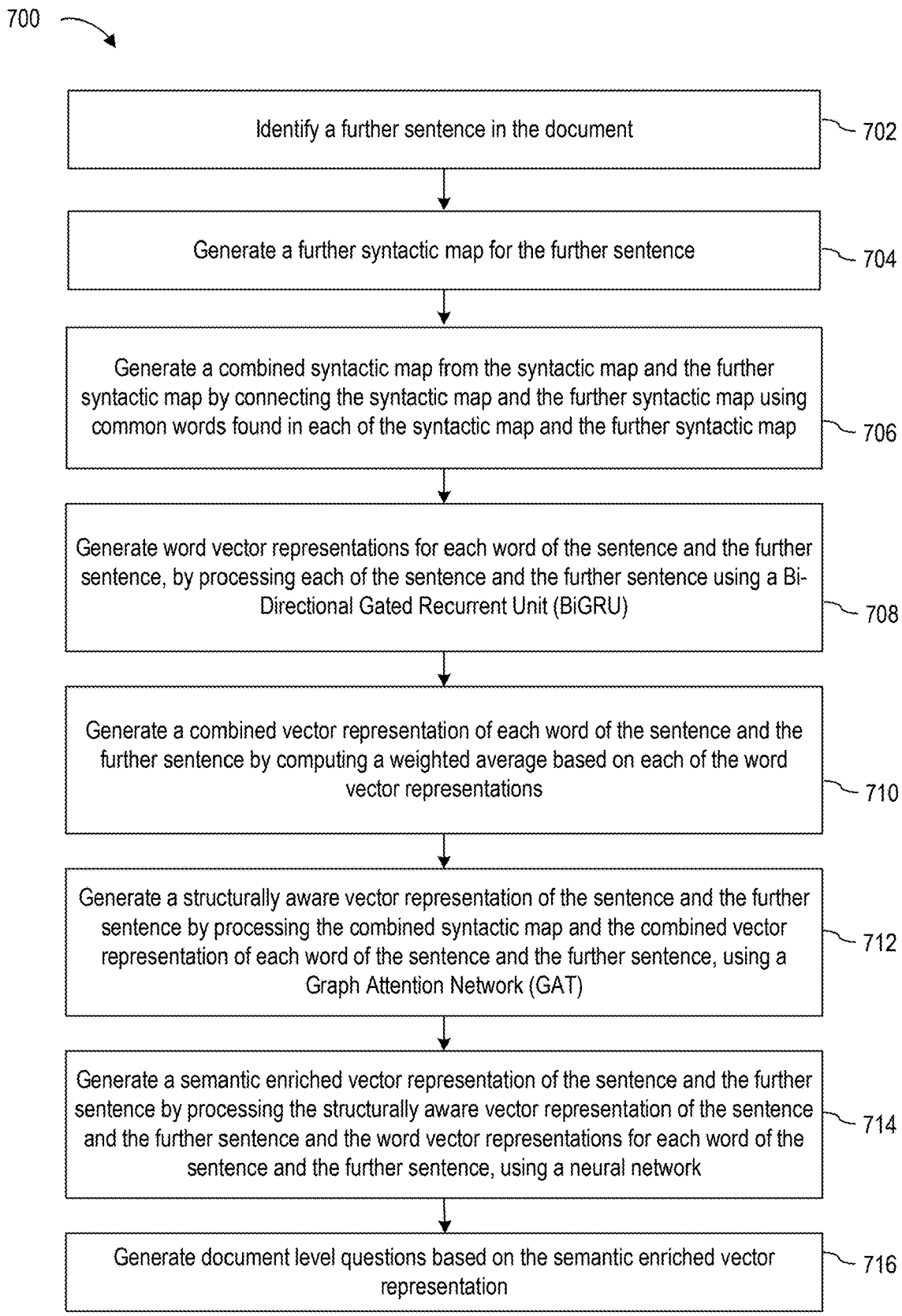
FIG. 7 is an example method of operating the system to generate document level questions according to aspects.

FIG. 7 is an example method 700 of operating the system 100 to generate document level questions according to aspects. Method 700 may be performed as a series of steps by a computing unit such as a processor. At step 702, method 700 can build off the method 600, and include identifying a further sentence in the document. The document may be the preprocessed document 122 for which a sentence has already been identified as indicated at step 604 of FIG. 6. At step 704, a further syntactic map for the further sentence may be generated. At step 706, a combined syntactic map from the syntactic map and the further syntactic map may be generated by connecting the syntactic map and the further syntactic map using common words found in each of the syntactic map and the further syntactic map. At step 708, word vector representations for each word of the sentence and the further sentence may be generated by processing each of the sentence and the further sentence using a Bi-Directional Gated Recurrent Unit (BiGRU). At step 710, a combined vector representation of each word of the sentence and the further sentence may be generated by computing a weighted average based on each of the word vector representations. At step 712, a structurally aware vector representation of the sentence and the further sentence may be generated by processing the combined syntactic map and the combined vector representation of each word of the sentence and the further sentence, using a graph attention network (GAT). At step 714, a semantic enriched vector representation of the sentence and the further sentence may be generated by processing the structurally aware vector representation of the sentence and the further sentence and the word vector representations for each word of the sentence and the further sentence, using a neural network. At step 716, document level questions (e.g., document level question 414) may be generated based on the semantic enriched vector representation.

Figure 8:
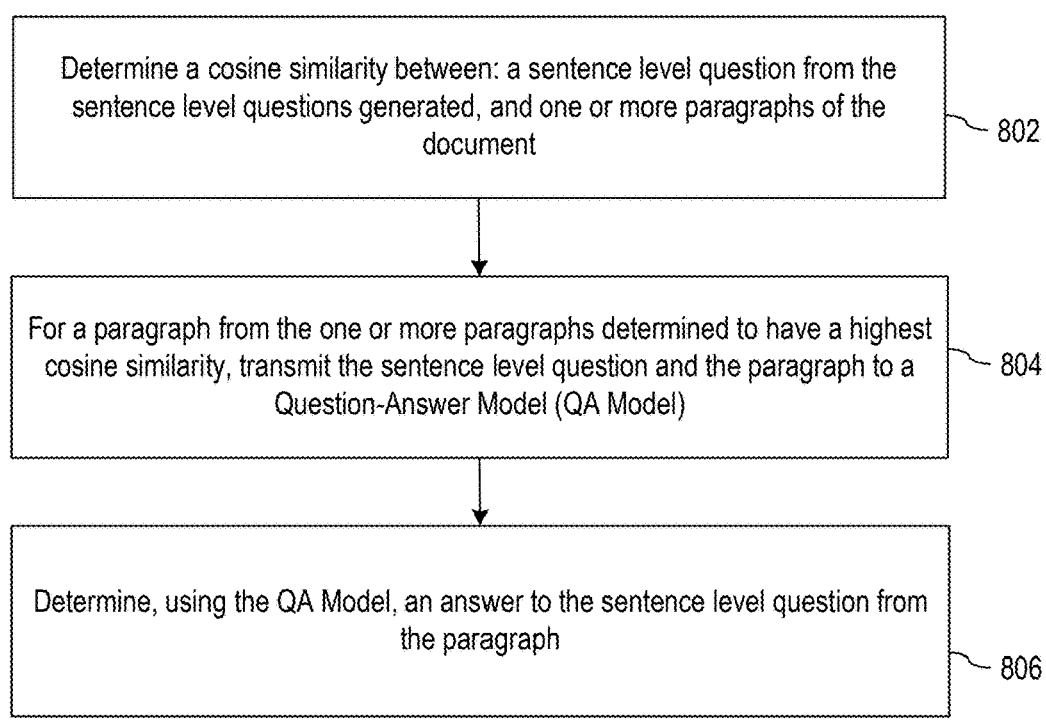
FIG. 8 is an example method of operating the system to retrieve answers to sentence level questions generated by the system according to aspects.

FIG. 8 is an example method 800 of operating the system 100 to retrieve answers to sentence level questions generated by the system 100 according to aspects. Method 800 may be performed as a series of steps by a computing unit such as a processor. At step 802, method 800 can include determining a cosine similarity between: a sentence level question 216 from the sentence level questions generated, and one or more paragraphs of the document (e.g., the preprocessed document 122). At step 804, for a paragraph from the one or more paragraphs determined to have a highest cosine similarity, the sentence level question 216 and the paragraph may be transmitted to a QA model 116. At step 806, using the QA model 116, an answer 512 to the sentence level question 216 may be determined from the paragraph.

FIG. 9, is an example method 900 of operating the system 100 to retrieve answers to document level questions generated by the system 100 according to aspects. Method 900 may be performed as a series of steps by a computing unit such as a processor. At step 902, method 900 can include determining a cosine similarity between: a document level question 414 from the document level questions generated, and one or more paragraphs of the document (e.g., the preprocessed document 122). At step 904, for a paragraph from the one or more paragraphs determined to have a highest cosine similarity, the document level question 414 and the paragraph may be transmitted to a QA model 116. At step 906, using the QA model 116, an answer 512 to the document level question 414 may be determined from the paragraph.

The operations of methods 600, 700, 800, and 900 are performed, for example, by system 100, in accordance with aspects described above.

Components of the System

Figure 10:
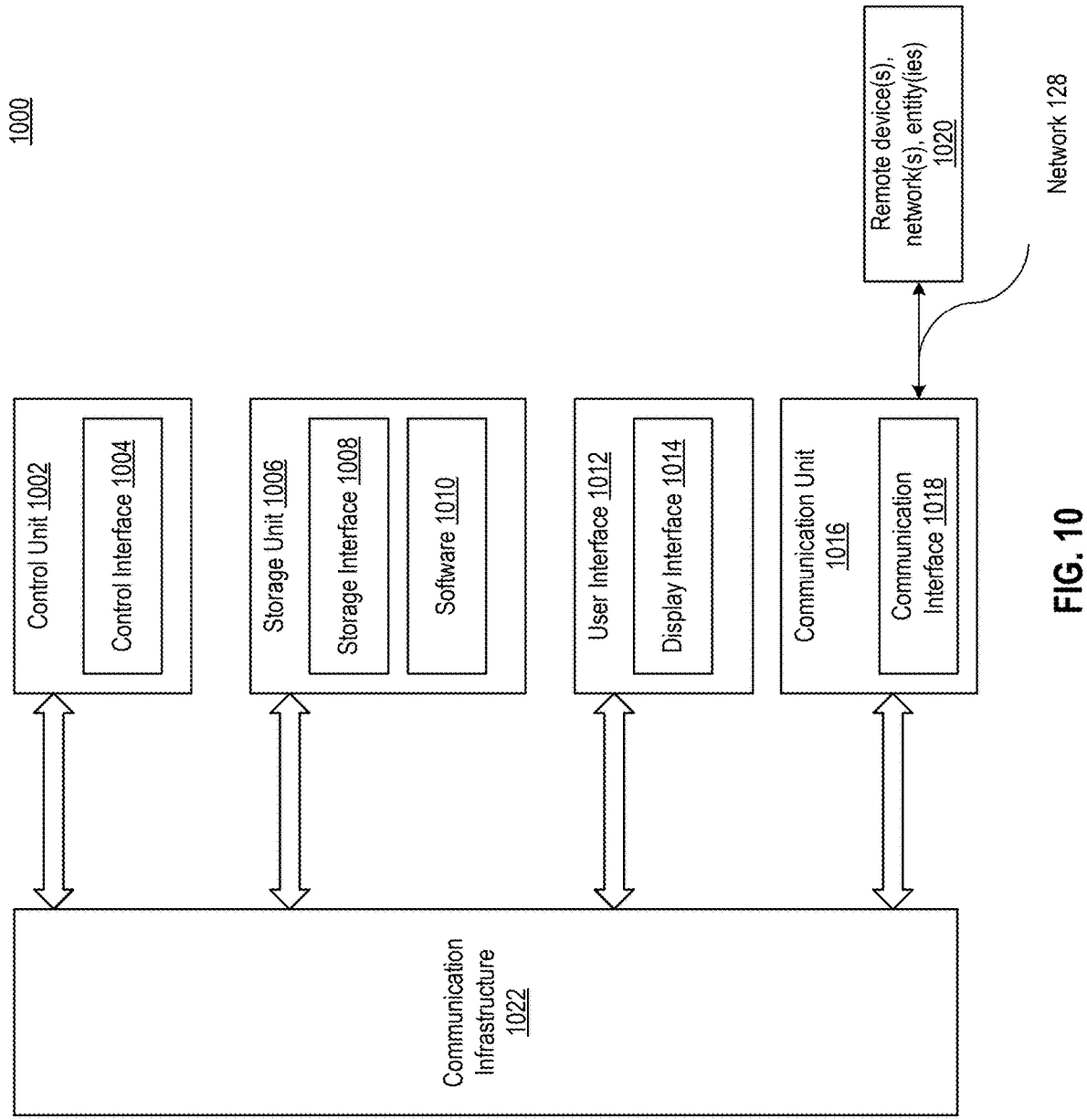
FIG. 10 is an example architecture of components for devices that may be used to implement the system according to aspects.

FIG. 10 is an example architecture 1000 of components for devices that may be used to implement the system 100 according to aspects. The components may be the components of the servers on which the system 100 is implemented. In aspects, the components may include a control unit 1002, a storage unit 1006, a communication unit 1016, and a user interface 1012. The control unit 1002 may include a control interface 1004. The control unit 1002 may execute a software 1010 to provide some or all of the intelligence of system 100. The control unit 1002 may be implemented in a number of different ways. For example, the control unit 1002 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 1004 may be used for communication between the control unit 1002 and other functional units or devices of system 100. The control interface 1004 may also be used for communication that is external to the functional units or devices of system 100. The control interface 1004 may receive information from the functional units or devices of system 100, or from remote devices 1020, such a client device, or may transmit information to the functional units or devices of system 100, or to remote devices 1020. The remote devices 1020 refer to units or devices external to system 100.

The control interface 1004 may be implemented in different ways and may include different implementations depending on which functional units or devices of system 100 or remote devices 1020 are being interfaced with the control unit 1002. For example, the control interface 1004 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 1004 may be connected to a communication infrastructure 1022, such as a bus, to interface with the functional units or devices of system 100 or remote devices 1020.

The storage unit 1006 may store the software 1010. For illustrative purposes, the storage unit 1006 is shown as a single element, although it is understood that the storage unit 1006 may be a distribution of storage elements. Also for illustrative purposes, the storage unit 1006 is shown as a single hierarchy storage system, although it is understood that the storage unit 1006 may be in a different configuration. For example, the storage unit 1006 may be formed with different storage technologies forming a memory hierarchical system including different levels of caching, main memory, rotating media, or off-line storage. The storage unit 1006 may be a volatile memory, a nonvolatile memory, an internal memory, an external memory, or a combination thereof. For example, the storage unit 1006 may be a nonvolatile storage such as nonvolatile random access memory (NVRAM), Flash memory, disk storage, or a volatile storage such as static random access memory (SRAM) or dynamic random access memory (DRAM).

The storage unit 1006 may include a storage interface 1008. The storage interface 1008 may be used for communication between the storage unit 1006 and other functional units or devices of system 100. The storage interface 1008 may also be used for communication that is external to system 100. The storage interface 1008 may receive information from the other functional units or devices of system 100 or from remote devices 1020, or may transmit information to the other functional units or devices of system 100 or to remote devices 1020. The storage interface 1008 may include different implementations depending on which functional units or devices of system 100 or remote devices 1020 are being interfaced with the storage unit 1006. The storage interface 1008 may be implemented with technologies and techniques similar to the implementation of the control interface 1004.

The communication unit 1016 may enable communication to devices, components, modules, or units of system 100 or to remote devices 1020. For example, the communication unit 1016 may permit the system 100 to communicate between the servers on which the system 100 is implemented and the client device. The communication unit 1016 may further permit the devices of system 100 to communicate with remote devices 1020 such as an attachment, a peripheral device, or a combination thereof through the network 128.

As previously indicated with respect to FIG. 1, the network 128 may span and represent a variety of networks and network topologies. For example, the network 128 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 128. Cable, Ethernet, digital subscriber line (DSL), fiber optic lines, fiber to the home (FTTH), and plain old telephone service (POTS) are examples of wired communication that may be included in the network 128. Further, the network 128 may traverse a number of network topologies and distances. For example, the network 128 may include direct connection, personal area network (PAN), local area network (LAN), metropolitan area network (MAN), wide area network (WAN), or a combination thereof.

The communication unit 1016 may also function as a communication hub allowing system 100 to function as part of the network 128 and not be limited to be an end point or terminal unit to the network 128. The communication unit 1016 may include active and passive components, such as microelectronics or an antenna, for interaction with the network 128.

The communication unit 1016 may include a communication interface 1018. The communication interface 1018 may be used for communication between the communication unit 1016 and other functional units or devices of system 100 or to remote devices 1020. The communication interface 1018 may receive information from the other functional units or devices of system 100, or from remote devices 1020, or may transmit information to the other functional units or devices of the system 100 or to remote devices 1020. The communication interface 1018 may include different implementations depending on which functional units or devices are being interfaced with the communication unit 1016. The communication interface 1018 may be implemented with technologies and techniques similar to the implementation of the control interface 1004.

The user interface 1012 may present information generated by system 100. In aspects, the user interface 1012 allows the users to interface with the system 100. The user interface 1012 can allow users of the system 100 to interact with the system 100. The user interface 1012 may include an input device and an output device. Examples of the input device of the user interface 1012 may include a keypad, buttons, switches, touchpads, soft-keys, a keyboard, a mouse, or any combination thereof to provide data and communication inputs. Examples of the output device may include a display interface 1014. The control unit 1002 may operate the user interface 1012 to present information generated by system 100. The control unit 1002 may also execute the software 1010 to present information generated by system 100, or to control other functional units of system 100. The display interface 1014 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 600, 700, 800, and 900, and system 100 are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method for question-answer pair generation, the method comprising:
   receiving, by one or more computing devices, a document;
   identifying, by the one or more computing devices, a sentence in the document;
   generating, by the one or more computing devices, a syntactic map for the sentence, wherein the syntactic map represents a grammatical structure of the sentence based on dependencies between words in the sentence;
   identifying, by the one or more computing devices, a further sentence in the document;
   generating, by the one or more computing devices, a further syntactic map for the further sentence;
   generating, by the one or more computing devices, a combined syntactic map from the syntactic map and the further syntactic map by connecting the syntactic map and the further syntactic map using common words found in each of the syntactic map and the further syntactic map;
   generating, by the one or more computing devices, word vector representations for encoding each word of the sentence and the further sentence, by processing each of the sentence and the further sentence using a Bi-Directional Gated Recurrent Unit (BiGRU) and giving weights to each word of the sentence and the further sentence based on the BiGRU being trained to recognize a relative importance of each word to the sentence and the further sentence based on its part of speech;
   generating, by the one or more computing devices, a combined vector representation of each word of the sentence and the further sentence by computing a weighted average based on each of the word vector representations;
   generating, by the one or more computing devices, a structurally aware vector representation of the sentence and the further sentence by processing the combined syntactic map and the combined vector representation of each word of the sentence and the further sentence, using a graph attention network (GAT);
   generating, by the one or more computing devices, a semantic enriched vector representation of the sentence and the further sentence by processing the structurally aware vector representation of the sentence and the further sentence and the word vector representations for each word of the sentence and the further sentence, using a neural network, wherein the semantic enriched vector representation comprises a value representing the importance of each word in the combined syntactic map;
   generating, by the one or more computing devices, document level questions based on the semantic enriched vector representation;
   determining, by the one or more computing devices, a cosine similarity between:
      a document level question from the document level questions generated, and one or more paragraphs of the document;
   for a paragraph from the one or more paragraphs determined to have a highest cosine similarity, transmitting, by the one or more computing devices, the document level question and the paragraph to a Question-Answer Model (QA Model);
   determining, by the one or more computing devices and using the QA Model, an answer to the document level question from the paragraph; and
   post-processing, by the one or more computing devices, the answer to determine whether the answer is redundant, incorrect, or irrelevant based on using a further trained model trained to recognize correct answers based on patterns of previous answers to similarly posed questions and determining which answers are most similar to the answer and discard answers deemed redundant, incorrect, or irrelevant.

2. The method of claim 1, wherein generating the document level questions further comprises:
   (a) identifying, by the one or more computing devices, a word from the semantic enriched vector representation, wherein the word is labeled as very important or important;
   (b) identifying, by the one or more computing devices, an interrogative word based on the word;
   (c) inserting, by the one or more computing devices, the interrogative word as a first word of a document level question;
   (d) determining, by the one or more computing devices, what further word to append to the first word based on calculating a probability of what the further word will be;
   (e) appending, by the one or more computing devices, to the first word the further word with a highest probability calculated; and
   (f) repeating (a)-(e) until a maximum sequence length is reached or an end of a sequence token is generated.

3. The method of claim 1, wherein the QA Model is deployed on a dedicated server as a Flask Application.

4. The method of claim 1, wherein the further trained model is trained using supervised learning techniques.

5. A non-transitory computer readable medium including instructions stored thereon that when executed by one or more processors of a computing system, cause the computing system to perform operations for question-answer pair generation, the operations comprising:
  receiving a document;
  identifying a sentence in the document;
  generating a syntactic map for the sentence, wherein the syntactic map represents a grammatical structure of the sentence based on dependencies between words in the sentence;
  identifying a further sentence in the document;
  generating a further syntactic map for the further sentence;
  generating a combined syntactic map from the syntactic map and the further syntactic map by connecting the syntactic map and the further syntactic map using common words found in each of the syntactic map and the further syntactic map;
  generating word vector representations for encoding each word of the sentence and the further sentence, by processing each of the sentence and the further sentence using a Bi-Directional Gated Recurrent Unit (BiGRU) and giving weights to each word of the sentence and the further sentence based on the BiGRU being trained to recognize a relative importance of each word to the sentence and the further sentence based on its part of speech;
  generating a combined vector representation of each word of the sentence and the further sentence by computing a weighted average based on each of the word vector representations;
  generating a structurally aware vector representation of the sentence and the further sentence by processing the combined syntactic map and the combined vector representation of each word of the sentence and the further sentence, using a graph attention network (GAT);
  generating a semantic enriched vector representation of the sentence and the further sentence by processing the structurally aware vector representation of the sentence and the further sentence and the word vector representations for each word of the sentence and the further sentence, using a neural network, wherein the semantic enriched vector representation comprises a value representing the importance of each word in the combined syntactic map;
  generating document level questions based on the semantic enriched vector representation;
  determining a cosine similarity between:
    a document level question from the document level questions generated, and one or more paragraphs of the document;
  for a paragraph from the one or more paragraphs determined to have a highest cosine similarity, transmitting the document level question and the paragraph to a Question-Answer Model (QA Model);
  determining, using the QA Model, an answer to the document level question from the paragraph; and
  post-processing the answer to determine whether the answer is redundant, incorrect, or irrelevant based on using a further trained model trained to recognize correct answers based on patterns of previous answers to similarly posed questions and determining which answers are most similar to the answer and discard answers deemed redundant, incorrect, or irrelevant.

6. The non-transitory computer readable medium of claim 5, wherein the operations further comprise generating the document level questions based on:
  (a) identifying a word from the semantic enriched vector representation, wherein the word is labeled as very important or important;
  (b) identifying an interrogative word based on the word;
  (c) inserting the interrogative word as a first word of a document level question;
  (d) determining what further word to append to the first word based on calculating a probability of what the further word will be;
  (e) appending to the first word the further word with a highest probability calculated; and
  (f) repeating (a)-(e) until a maximum sequence length is reached or an end of a sequence token is generated.

7. The non-transitory computer readable medium of claim 5, wherein the QA Model is deployed on a dedicated server as a Flask Application.

8. The non-transitory computer readable medium of claim 5, wherein the further trained model is trained using supervised learning techniques.

9. A computing system for question-answer pair generation comprising:
  a communications unit including microelectronics configured to receive a document; and
  one or more processors, coupled to the communications unit, configured to:
    identify a sentence in the document;
    generate a syntactic map for the sentence, wherein the syntactic map represents a grammatical structure of the sentence based on dependencies between words in the sentence;
    identify a further sentence in the document;
    generate a further syntactic map for the further sentence;
    generate a combined syntactic map from the syntactic map and the further syntactic map by connecting the syntactic map and the further syntactic map using common words found in each of the syntactic map and the further syntactic map;
    generate word vector representations for encoding each word of the sentence and the further sentence, by processing each of the sentence and the further sentence using a Bi-Directional Gated Recurrent Unit (BiGRU) and giving weights to each word of the sentence and the further sentence based on the BiGRU being trained to recognize a relative importance of each word to the sentence and the further sentence based on its part of speech;
    generate a combined vector representation of each word of the sentence and the further sentence by computing a weighted average based on each of the word vector representations;
    generate a structurally aware vector representation of the sentence and the further sentence by processing the combined syntactic map and the combined vector representation of each word of the sentence and the further sentence, using a graph attention network (GAT);
    generate a semantic enriched vector representation of the sentence and the further sentence by processing the structurally aware vector representation of the sentence and the further sentence and the word vector representations for each word of the sentence and the further sentence, using a neural network, wherein the semantic enriched vector representation comprises a value representing the importance of each word in the combined syntactic map;

generate document level questions based on the semantic enriched vector representation;

determine a cosine similarity between:
   a document level question from the document level questions generated, and one or more paragraphs of the document;

for a paragraph from the one or more paragraphs determined to have a highest cosine similarity, transmit the document level question and the paragraph to a Question-Answer Model (QA Model);

determine, using the QA Model, an answer to the document level question from the paragraph; and post-process the answer to determine whether the answer is redundant, incorrect, or irrelevant based on using a further trained model trained to recognize correct answers based on patterns of previous answers to similarly posed questions and determining which answers are most similar to the answer and discard answers deemed redundant, incorrect, or irrelevant.

10. The computing system of claim 9, wherein the one or more processors are further configured to generate the document level questions based on:

(a) identifying a word from the semantic enriched vector representation, wherein the word is labeled as very important or important;

(b) identifying an interrogative word based on the word;

(c) inserting the interrogative word as a first word of a document level question;

(d) determining what further word to append to the first word based on calculating a probability of what the further word will be;

(e) appending to the first word the further word with a highest probability calculated; and (f) repeating (a)-(e) until a maximum sequence length is reached or an end of a sequence token is generated.

11. The computing system of claim 9, wherein:

the QA Model is deployed on a dedicated server as a Flask Application.

12. The computing system of claim 9, wherein the further trained model is trained using supervised learning techniques.

\* \* \* \* \*